United States Patent [19]

Watanabe et al.

[11] Patent Number: 4,816,071

[45] Date of Patent: Mar. 28, 1989

[54] COATING COMPOSITION

[75] Inventors: Takashi Watanabe, Naka; Ikuo Sumina, Uji, both of Japan

[73] Assignee: Takeda Chemical Industries, Ltd., Osaka, Japan

[21] Appl. No.: 112,625

[22] Filed: Oct. 23, 1987

[30] Foreign Application Priority Data

Nov. 6, 1986 [JP] Japan .................. 61-262752

[51] Int. Cl.$^4$ .................. C09D 5/14; C09D 3/40; C07D 333/48
[52] U.S. Cl. .................. 106/18.34; 106/15.05; 106/16; 106/17; 106/18; 106/18.35; 549/82; 549/87
[58] Field of Search .................. 106/15.05, 16, 17, 18, 106/18.34, 18.35; 523/122; 514/446; 549/82, 87

[56] References Cited

U.S. PATENT DOCUMENTS

| | | | |
|---|---|---|---|
| 2,939,871 | 6/1960 | Pyne et al. | 549/82 |
| 2,957,887 | 10/1960 | Berkey et al. | 549/82 |
| 3,821,396 | 6/1974 | Shema et al. | 514/446 |
| 3,822,351 | 7/1974 | Shema et al. | 514/446 |
| 3,824,316 | 7/1974 | Shema et al. | 514/446 |
| 4,143,015 | 3/1979 | Soeterik | 106/15.05 |
| 4,221,839 | 9/1980 | de Graaf | 106/15.05 |

Primary Examiner—Paul Lieberman
Assistant Examiner—Helene Kirschner
Attorney, Agent, or Firm—Wenderoth, Lind & Ponack

[57] ABSTRACT

A coating composition comprising a film forming binder and an antifoulingly effective amount of at least one of 3,3,4, 4-tetrachlorotetrahydrothiophene-1,1,-dioxide and 3,3, 4-trichlorotetrahydrothiophene-1,1-dioxide as an effective ingredient is highly useful as an underwater antifouling agent.

3 Claims, No Drawings

COATING COMPOSITION

BACKGROUND AND PRIOR ART

This invention relates to a coating composition. More particularly, this invention relates to a low-toxic antifouling coating composition for inhibiting the adhesion and growth of underwater organisms on the surface of ships, port facilities, buoys, pipelines, bridges, submarine bases, excavators for submarine oil fields, raceways in power plants, culture nets, fixed shore nets etc. (hereinafter referred to briefly as underwater structures).

In the sea, rivers, lakes and marshes many underwater organisms such as acorn barnacles, sea squirts, serpula, *Mytilus edulis*, fresh-water mussels, *Bugula neritina*, green laver or sea lettuce present fouling problems with respect to the above underwater structures and the adhesion and growth of these organisms on the surface or on the splashed parts of the underwater structures cause considerable damages.

For example, when organisms adhere to ships' hulls, the frictional resistance increases and the sailing speed decreases, and thereby maintaining a fixed speed results in increased fuel consumption. This gives rise to economical disadvantage.

In the case where underwater organisms adhere to port facilities, the materials therof are often eroded.

Where the organisms adhere to culture nets or fixed shore nets, the mesh of these nets become blocked.

Hitherto, for the purpose of inhibiting the adhesion and growth of underwater organisms, antifouling coating compositions containing a highly toxic antifouling agent, such as organotin or cuprous oxide have been coated to the surface of underwater structures, so that the adhesion and growth of underwater organisms could be inhibited.

However, the highly toxic antifouling agents are harmful to environmental safety and hygiene when these coating compositions are produced or actually used.

Moreover, these highly toxic antifouling agents gradually dissolve out of the coating composition film formed on the surface of the underwater structures, thereby causing water pollution and unfavorable effects on desirable underwater life such as fish, shellfish etc.

Accordingly, the development of antifouling coating compositions which exert excellent antifouling effects over a prolonged period, and are of low toxicity to humans and desirable underwater life have been strongly demanded.

The present inventors have conducted studies to obtain coating compositions which are of low toxicity to humans and desirable underwater life, yet exhibit strong antifouling activity against underwater organisms.

As a result, the present inventors have found that two compounds as explained hereinafter are very safe, yet exhibit excellent antifouling effects. These findings were followed by continued studies, which have culminated in the present invention.

BRIEF SUMMARY OF THE INVENTION

The present invention provides a coating composition which comprises a film forming binder and at least one of 3,3,4,4-tetrachlorotetrahydrothiophene-1,1-dioxide, i.e. a compound of the formula:

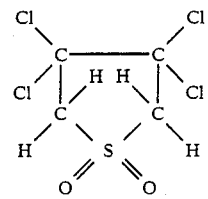

and 3,3,4-trichlorotetrahydrothiophene-1,1-dioxide, i.e. a compound of the formula:

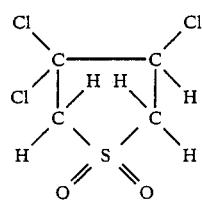

an an effective ingredient.

3,3,4,4-tetrachlorotetrahydrothiophene-1,1-dioxide and 3,3,4-trichlorotetrahydrothiophene-1,1-dioxide (hereinafter these will be referred to simply as low-toxic antifouling agents) are known (see U.S. Pat. No. 2,957,887, U.S. Pat. No. 3,821,396, U.S. Pat. No. 3,822,351), but the antifouling effects of these compounds against underwater organisms have not been known until now.

The present inventors found that these compounds exert excellent antifouling effects against undesirable underwater organisms equal or superior to cuprous oxide-copolymer or tributyltin-copolymer. That is, the above two low-toxic antifouling agents dissolve into water out from the coating composition film formed on the surface of the underwater structures so that they can combat underwater organisms in the neighborhood of the coating composition film.

The above mentioned two low-toxic antifouling agents can prevent the adhesion as well as the growth of underwater organisms. Furthermore, the above low-toxic antifouling agents unexpectedly decompose rapidly as soon as the antifouling agents dissolve into water, to lose toxicity against humans, fish and shellfish.

It has been experimentally proven that the above low-toxic antifouling agents do not cause any adverse effects, even if they have been absorbed by humans, fish and shellfish.

DETAILED DESCRIPTION

One or both of the low-toxic antifouling agents are desirably used in an amount of about about 0.1% to 50%, more preferably 0.5% to 25% by weight of the total coating composition. The antifouling coating composion of the present invention which contains one or both of the above low-toxic antifouling agents exerts a very strong effect, but may additionally contain one or more of the conventional antifouling agents, such as organotin compounds e.g. triphenyltin hydroxide, triphenyltin chloride, triphenyltin fluoride, triphenyltin acetate, triphenyltin dimethyldithiocarbamate, bis(triphenyltin) oxide, tri(phenyltin) versatic acid, tri(phenyltin) nicotinic acid, triphenyltin α, α'-dibromosuccinate, triphenyltin monochloroacetate, tributyltin fluoride, bis(tibutyltin) α, α'-dibromosuccinate or tributyltin methacrylate-copolymer; organochlorines e.g. DDT or BHC; thiurams e.g. tetraalkylthiuram disulfide; carbamates e.g. zinc dimethyldithiocarbamate; or cuprous oxide.

Referring to the antifouling coating composition of the present invention, a film forming binder for coating compositions is employed as one of the vehicles of the composition.

As the film forming binder, those film forming materials which are conventionally used in antifouling coating compositions may be employed. The examples of the film forming binder include a polymeric binder such as vinyl chloride-vinyl acetate copolymers, vinyl chloride-vinyl isobutyl ether copolymers, styrene-butadiene copolymers, chlorinated rubber resins, chlorinated polypropylene resins, petroleum resins, alkyd resins, acryl resins, phenolic resins, synthetic rubbers, epoxy resins, silicon rubbers, silicon resins, Teflon (tetrafluoroethylene) resins or rosin resins. Among these, silicon rubbers and silicon resins are preferred to improve the antifouling effect of the present invention.

The antifouling coating composition of the present invention may additionally include plasticizers for the purpose of regulating the physical properties of antifouling coating composition film.

The examples of the plasticizers include phthalate derivatives such as diethyl phthalate, dibutyl phthalate, diisobutyl phthalate, dioctyl phthalate, butyl benzyl phthalate or glycol acid butyl phthalate; phosphate derivatives such as tricresyl phosphate, triphenyl phosphate or diphenyl cresyl phosphate; epoxy derivaties such as epoxy bean oil; paraffin; and paraffin derivatives such as chlorinated paraffin.

In the antifouling coating composition of the present invention, 3,3,4,4-tetrachlorotetrahydrothiophene-1,1-dioxide or/and 3,3,4-trichlorotetrahydrothiophene-1,1-dioxide may usually be used in an amount of about 1 to 350 weight parts, preferably about 5 to 150 weight parts, more preferably 5 to 80 weight parts per 100 weight parts of the film forming binder (solids component) for the coating composition.

The above mentioned plasticizers may be incorporated into the composition of the present invention in an amount not more than 20 weight parts per 100 weight parts of the film forming binder for the coating composition.

The antifouling composition of the present invention may additionally include known coloring pigments such as red iron oxide, titanium dioxide, carbon, phthalocyanine blue B or cyanine green or/and filler or body pigments such as talc, barium oxide or zinc oxide.

The composition of the present invention may additionally contain organic solvents for the purpose of regulating the viscosity of coating composition.

The examples of the organic solvents include any solvent which can dissolve or disperse the film forming binder or plasticizers as mentioned above, such as hydrocarbons, e.g. xylene or toluene; ketones, e.g. methyl ethyl ketone or methyl isobutyl ketone; esters, e.g. butyl acetate or ethyl acetate.

The coating composition of the present invention is produced by per se known procedures, for example by mixing the above mentioned ingredients.

The coating composition of the present invention may be formulated into a water-insoluble type of matrix in which low toxic antifouling agent comprising 3,3,4,4-tetrachlorotetrahydrothiophene-1,1-dioxide or/and 3,3,4-trichlorotetrahydrothiophene-1,1-dioxide (as well as the conventional antifouling agents if they are incorporated) dissolve in water and a water-soluble type of matrix in which the film forming binder dissolves in water together with the above active ingredients.

The coating composition of the present invention is preferably used as marine antifouling coating composition.

The coating composition film obtained from the antifouling coating composition of the present invention exhibits particularly good antifouling effects again acorn barnacles.

A composition of the above low toxic antifouling agents with the conventional antifouling agent possesses a higher degree of antifouling activity against underwater organisms, in comparison with the composition containing either of the above low toxic antifouling agents.

Below are illustrative examples of the preparation of the coating composition of the present invention.

In the examples all parts are parts by weight and all % are % by weight, unless otherwise specified.

EXAMPLE 1

Pliolite S-5 (B) [trade name of a commercial product of Goodyear Co. (U.S.A.), solid component: 100% styrene-butadiene copolymer]: 10 parts rosin: 10 parts Adekacizer E 450 [trade name of a commercial product of Adeka Argus Chemical Co., Ltd. (Japan), component: chlorinated n-paraffin]: 5 parts The above ingredients were dissolved in 34 parts of xylene, followed by admixing the additional ingredients as described below. 3,3,4,4-tetrachlorotetrahydrothiophene 1,1-dioxide: 10 parts red iron oxide: 5 parts talc: 20 parts Aerosil [trade name of a commercial product of Degussa Co. (West Germany), component: silicon oxide]: 1 part The obtained mixture was further mixed to give a uniform coating composition.

EXAMPLES 2 TO 7 AND COMPARATIVE EXAMPLES 1 TO 2

In accordance with formulations of the following Table 1, the coating compositions of Examples 2 to 7 and Comparative Examples 1 to 2 were obtained by the same procedure as in Example 1.

TABLE 1

|  | Example No. | | | | | | | Comparative Example No. | |
| --- | --- | --- | --- | --- | --- | --- | --- | --- | --- |
|  | 1 | 2 | 3 | 4 | 5 | 6 | 7 | 1 | 2 |
| Pliolite ® S-5(B) | 10 | 10 | 10 | — | — | — | — | 10 | 10 |
| KE 44RTV[1] | — | — | — | — | 50 | 50 | 50 | — | — |
| Rosin | 10 | 10 | 10 | — | — | — | — | 10 | 10 |
| Adecacizer ® E450 | 5 | 5 | 5 | 5 | — | — | — | 5 | 5 |
| low-toxic antifouling agents |  |  |  |  |  |  |  |  |  |
| 3,3,4,4-Tetrachlorotetrahydrothiophene-1,1-dioxide | 10 | — | 10 | — | 10 | — | 3 | — | — |
| 3,3,4-trichlorotetrahydrothiophene-1,1-dioxide | — | 10 | — | 10 | — | 10 | — | — | — |
| Cuprous oxide | — | — | 20 | — | — | — | — | 30 | — |

TABLE 1-continued

|  | Example No. | | | | | | | Comparative Example No. | |
| --- | --- | --- | --- | --- | --- | --- | --- | --- | --- |
|  | 1 | 2 | 3 | 4 | 5 | 6 | 7 | 1 | 2 |
| tri-Butyltin methacrylate copolymer[2] | — | — | — | 30 | — | — | — | — | 10 |
| Red iron oxide | 5 | 5 | 5 | 5 | — | — | 7 | 5 | 5 |
| Talc | 20 | 20 | — | 10 | — | — | — | — | 20 |
| Aerosil ® 200 | 1 | 1 | 1 | 1 | 1 | 1 | 1 | 1 | 1 |
| Xylene | 39 | 39 | 39 | 39 | 39 | 39 | 39 | 39 | 39 |

KE 44RTV[1]: Trade name of Shinetu Chem. Ltd., Japan, solid component: 100% silicon rubber which hardens at room temperature
tri-Butyltin methacrylate copolymer[2]: content of tributyltin is 20% by weight.

TEST EXAMPLE 1

Sandblast boards were coated with an anticorrosive paint made from chlorinated rubbers and dried at room temperature to obtain undercoated sandblast boards.

Each of the thus obtained boards was coated with each of the coating compositions of Examples 1 to 7 and Comparative Examples 1 to 2 and the thickness of the dried coating composition film was about 60μ.

After drying at room temperature, the boards were submerged by use of raft in Toba Bay, Mie prefecture, Japan for 6 months or 12 months and then area of surface to which underwater organisms adhered was measured.

The results were shown by means of % in Table 2.

As for Comparative Example 3, the undercoated sandblast board was used also as a test material.

Table 2 clearly shows that the coating compositions of the present invention exert a much superior antifouling effect than the composition of the Comparative Examples.

TABLE 2

|  | Antifouling effect (%) | | | |
| --- | --- | --- | --- | --- |
|  | After 6 months | | After 12 months | |
|  | Acorn Barnacle | Green Laver | Acorn Barnacle | Green Laver |
| Example No. | | | | |
| 1 | 0 | 0 | 0 | 10 |
| 2 | 0 | 0 | 0 | 10 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| Comparative Example No. | | | | |
| 1 | 0 | 0 | 10 | 10 |
| 2 | 0 | 0 | 10 | 20 |
| 3 | 100 | 100 | — | — |

What is claimed is:

1. An underwater antifouling coating composition which comprises a film forming binder selected from the group consisting of vinyl chloride-vinyl acetate copolymers, vinyl chloride-vinyl isobutyl ether copolymers, styrene-butadiene copolymers, chlorinated rubber resins, chlorinated polypropylene resins, petroleum resins, alkyd resins, acryl resins, phenolic resins, synthetic rubbers, epoxy resins, silicon rubbers, silicon resins, tetrafluoroethylene resins and rosin resins and an antifoulingly effective amount of at least one of 3,3,4,4-tetrachlorotetrahydrothiophene-1,1-dioxide and 3,3,4-trichlorotetrahydrothiopene-1,1-dioxide as effective ingredient.

2. The composition as claimed in claim 1, wherein the effective ingredient is 3,3,4,4-tetrachlorotetrahydrothiophene-1,1-dioxide.

3. The composition as claimed in claim 1, wherein the amount of the effective ingredient is in the range of about 0.1% to 50% by weight of the total coating composition.

* * * * *